United States Patent
Kao et al.

(10) Patent No.: US 6,856,847 B2
(45) Date of Patent: Feb. 15, 2005

(54) METHOD OF IDENTIFYING BOTTLENECKS AND IMPROVING THROUGHPUT IN WAFER PROCESSING EQUIPMENT

(75) Inventors: Tony Kao, Chiai (TW); Stark Chen, Tainan (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 206 days.

(21) Appl. No.: 10/175,104

(22) Filed: Jun. 19, 2002

(65) Prior Publication Data

US 2003/0236585 A1 Dec. 25, 2003

(51) Int. Cl.[7] .............................................. G06F 19/00
(52) U.S. Cl. ...................... 700/100; 700/117; 700/121; 438/5; 209/552
(58) Field of Search ........................... 438/5; 209/552; 700/95, 98, 100, 117, 121; 414/935

(56) References Cited

U.S. PATENT DOCUMENTS

| | | | | | |
|---|---|---|---|---|---|
| 6,092,000 | A | * | 7/2000 | Kuo et al. | 700/115 |
| 6,166,801 | A | * | 12/2000 | Dishon et al. | 355/27 |
| 6,491,451 | B1 | * | 12/2002 | Stanley et al. | 396/611 |
| 6,564,113 | B1 | * | 5/2003 | Barto et al. | 700/99 |
| 6,622,055 | B2 | * | 9/2003 | Fan et al. | 700/99 |

* cited by examiner

*Primary Examiner*—Jayprakash N. Gandhi
(74) *Attorney, Agent, or Firm*—Tung & Associates

(57) ABSTRACT

Throughput in a semiconductor wafer processing system, such as in-line photolithography equipment, is improved by identifying and correcting bottlenecks in the flow of wafers through multiple, associative segments of the equipment. Segmental rather than total processing times are monitored in order to identify the segments having the longest processing times. The theory of constraints is applied to identify the process segment representing a bottleneck in the process, and effect improvements in the bottleneck segment that provide greater overall throughput.

17 Claims, 3 Drawing Sheets

| Tool_ID | Recp_ID | Normal Lot No | Processing Time (sec) | | | B/N |
|---|---|---|---|---|---|---|
| | | | TC | TS | TD | |
| B | TMXXXX/180 | 9 | 67 | 32 | 180 | DEV |
| A | TMXXXX/180 | 14 | 74 | 46 | 180 | SCN |
| B | TMXXXX/181 | 6 | 73 | 32 | 180 | DEV |
| A | TMXXXX/181 | 5 | 69 | 47 | 180 | SCN |
| B | TMXXXX/184 | 6 | 69 | 36 | 180 | DEV |
| A | TMXXXX/184 | 9 | 72 | 43 | 180 | DEV |

US 6,856,847 B2

METHOD OF IDENTIFYING BOTTLENECKS AND IMPROVING THROUGHPUT IN WAFER PROCESSING EQUIPMENT

TECHNICAL FIELD

The present invention broadly relates to techniques for processing semiconductor wafers, and deals more particularly with a method for identifying bottlenecks in wafer processing flow, and improving wafer throughput.

BACKGROUND OF THE INVENTION

The current, highly competitive semiconductor market is forcing semiconductor companies to constantly seek improvements in productivity by reducing manufacturing time while maintaining or increasing production output. The small feature sizes and the large number of steps required to fabricate state-of-the-art integrated circuits on semiconductor wafers makes it essential that each of the process steps meet a tight set of specifications. Since process variations are inevitable, performance monitoring techniques such as statistical process control (SPC) are commonly used to control fabrication processes. In addition to statistical techniques for controlling process quality, a number of other techniques have been developed to measure the performance of equipment in terms of reliability, availability, maintainability, and utilization of process tools. For example, it is well known to measure tool performance based on status tracking using common indices such as WPH (Wafers Per Hour), MTTR (Mean Time To Repair), MTBF (Mean Time Between Failure), etc. More recently, an industry accepted performance measurement known as OEE (Overall Equipment Effectiveness) has been used as a performance metric which takes into consideration the availability, operational efficiency, rate efficiency and rate of quality when computing the effectiveness of process tools.

Although highly effective in some applications such as a single process tool, these techniques and indices do not lend themselves for effective use in the case of multiple tools that are combined into a single piece of equipment, where the tools are arranged in-line to perform sequential processing steps that are associative. Sequential tools are sometimes referred to as serial tools because they process wafers in a series of sub-steps formed in separate modules or "tool units" of the equipment. One example of combined, associative tools is a so-called scanner and track for carrying out photolithographic processing of the wafers. This process is carried out in three basic steps. First, a photoresist is applied to each wafer in a coater. The wafers are then exposed to a radiation source in a stepper, and finally each exposed wafer is developed in a photoresist developer. Since the IC's are typically multilayered, this process is repeated a number of times. The "track" referred to above includes both a coater and a developer. The scanner, which is combined with the track in a single cluster tool, is used to scan defects in the coated wafers, prior to developing.

In the past, because the scanner and track are formed in a single, combined cluster tool, the traditional indices have been inadequate for analyzing and tracking in-line performance of the equipment. Although computer integrated manufacturing (CIM) techniques are capable of measuring total processing time for wafers flowing through the scanner and track, this collected data provides little information regarding the processing efficiency of individual equipment components (tool units), and the bottlenecks in flow that may exist within the cluster tool.

Accordingly, there is a need in the art for a method of identifying bottlenecks and improving throughput of wafer processing equipment having in-line, associated tools. The present invention is directed towards providing a solution to this problem

SUMMARY OF THE INVENTION

According to one aspect of the invention, a method is provided for determining a bottleneck in the flow of products through a cluster tool having a plurality of differing process segments wherein each of the segments includes multiple process machines or tool units. The method includes determining the number of tool units in each segment, determining the segmental process time for each of the segments based on a preselected lot size, calculating the throughput of the wafers, and identifying the bottleneck based on the segment having the longest segmental process time. The throughput is calculated by dividing the total segment process times by the number of process machines in the corresponding segment.

According to another aspect of the invention, a method is provided for improving the throughput performance of a photolithography cluster tool having multiple process segments for processing semiconductor wafers, comprising the steps of: determining the segmental process time for each of the segments based on a wafer lot of predetermined size; identifying a segment causing a bottleneck in the flow of wafers through the segments based on the determined times, and making process changes in the segment identified as being the bottleneck.

Accordingly, it is a primary object of the present invention to provide a method for analyzing the performance of in-line, associative process tools in order to eliminate bottlenecks and improve throughput.

Another aspect of the invention is to provide a method as described above which employs the application of the theory of constraints to analyze individual equipment performance and eliminate bottlenecks in order to improve process flow.

A still further object of the invention is to provide a method as described above which provides a means for analyzing the performance differences among associative in-line tools.

Another object of the invention is to provide a method as generally described above that yields process performance and flow information that can be employed for improved dispatching in order to increase the equipment utilization and improve product throughput.

These, and further objects and advantage of the present invention will be made clear or will become apparent during the course of the following description of a preferred embodiment.

BRIEF DESCRIPTION OF THE DRAWINGS

In the drawings, which form an integral part of the specification, and are to be read in conjunction therewith, and in which like components are used to designate identical components in the various views.

DETAILED DESCRIPTION OF THE PREFERRED EMBODIMENT

Figure 1:
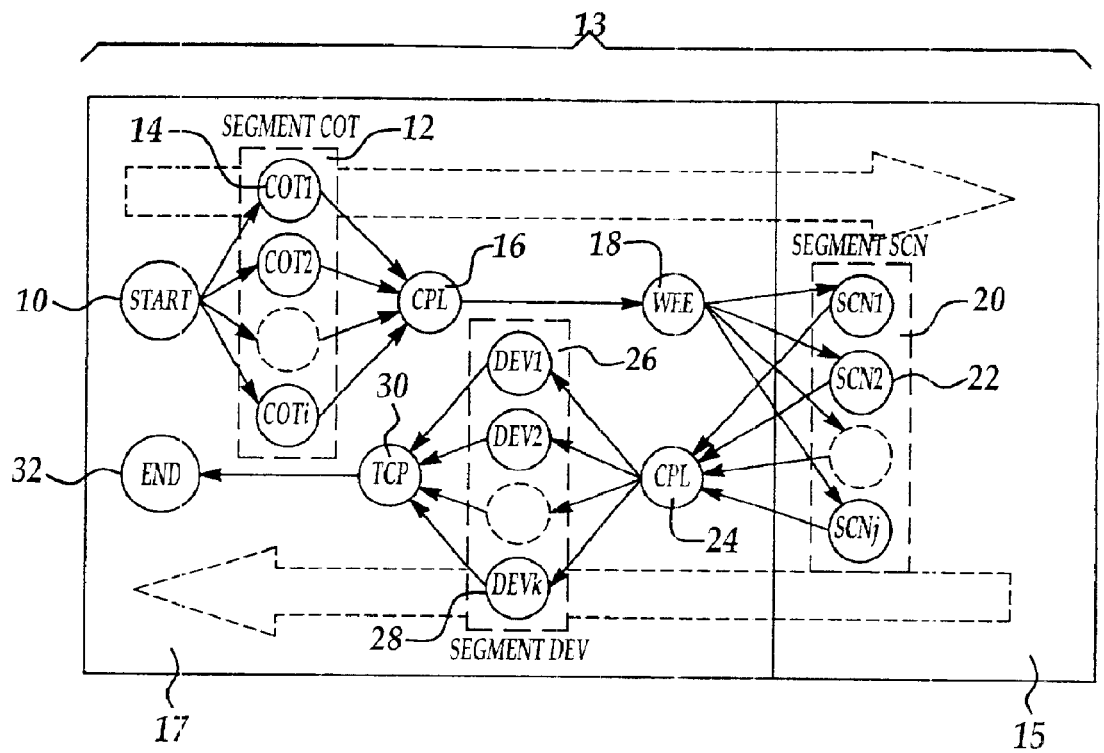
FIG. 1 is a diagrammatic view showing the flow of wafers through a track and scanner cluster tool.

The present invention is concerned with equipment that includes a plurality of in-line, associative processing tools. In the illustrated embodiment, the equipment comprises a conventional photolithography station in the form of a well known cluster tool 13 that provides the functions of coating, scanning, and developing. This equipment is diagrammatically represented in FIG. 1, and includes a conventional scanner 15 and a track 17. From the standpoint of the process flow of wafers, the equipment can be viewed as having a plurality of in-line segments through which wafers flow in a serial manner. Specifically, it includes a coating segment 12 (COT), scanning segment 20 (SCN) and a developing segment 26 (DEV). Segments 12, 20, 26 include one or more tool units for carrying out identical process functions within the segments. For example, COT segment 12 includes a plurality of coating tool units 14. Similarly, SCM segment 20 includes a plurality of scanning tool unit 22 and the DEV segment 26 includes a plurality of developing tool units 28. Wafers are delivered from a starting point 10 to each of the coating units 14. Coated wafers are passed through a cooling processing station (CPL) 16 and thence to a WEE operation 18. WEE (Wafer Edge Exposure) is a process in which the edge of the wafer is fabricated such that polishing contaminants and slurry residues are prevented from entering the scribed channels of the wafer.

Following WEE, the wafers are delivered to a buffer (not shown) before passing on to the SCN segment 20 where the wafers are scanned at any of the plurality of the scanning tool units 22. Following scanning, the wafers are passed through another buffer (not shown) before being delivered to a second cooling processing station 24. Finally, the wafers are delivered to the developing tool units 28 forming the DEV segment 26. After being developed, the wafers are passed through a transfer and chill plate 30 before reaching the end 32 of the process.

Heretofore, computer integrated manufacturing (CIM) techniques assessed the effectiveness of the scanner 15 and track 17 as a single unit. In other words, the time for a wafer to pass from start 10 to the end 32 was measured, and this was the sole metric determining the throughput performance of the scanner and track. In fact, however, the processes carried out in the various segments are interrelated and/or can influence each other. Because of this interrelationship, the throughput through the scanner 15 and track 17 sometimes decreased unexplainably, and it was not possible to correct the problem. The use of the above mentioned buffers, while improving throughput, did not entirely solve the problem. In contrast, the present invention advantageously utilizes the so-called "theory of constraints" to monitor the processing time of each of the segments 12, 20, 26 rather than the total processing time through the cluster tool 13, and provides an indication of the slowest segment which indicates a bottleneck. According to the theory of constraints, attention is focused on the weakest link in the process chain, since the overall process can be no better than its weakest link. By focusing attention on improving the weakest link or "constraint", the overall process can be improved. In essence, the present inventive method monitors the segmental processing times, determines the location of the bottleneck and then adjusts the performance of all the tools within a given segment to be as good as the tool having the best performance.

In accordance with the present method, the track and scanner are viewed as three separate segments 12, 20, 26, each including a plurality of identical tool units. Using conventional CIM techniques, CEID (Collected Event ID) events related to the tool units are selected and the times of each wafer entering or leaving each tool unit is recorded. Each of the tool units (e.g. 14, 22, 28) within a given segment 12, 20, 26 has two CEID events, including an "in" time and "out" time. In FIG. 1, segment COT includes units COT1 . . . COTi. Segment SCN 22 includes tool units SCN1 . . . SCNj, and finally segment DEV 26 includes tool units DEV1 . . . DEVk. Thus, the total tool unit quantity is i+j+k, and the total CEID quantity is therefore (i+j+k)×2.

The ideal processing times for the segments 12,20, 26 are determined as follows:

$TCm = OutC\,(m) - InC\,(m)$  Processing time of wafer m in unit COT1 COT2, . . . COTi
$TSm = OutS\,(m) - InS\,(m)$  Processing Time of wafer m in unit SCN1, SCN2, . . . SCNj
$TDm = OutD\,(m) - InD\,(m)$  Processing Time of wafer m in unit DEV1, DEV2, . . . DEVk
where:  Out (m) is the time wafer m leaves the unit, and
 In (m) is the time wafer m enters the unit.

Figure 2:
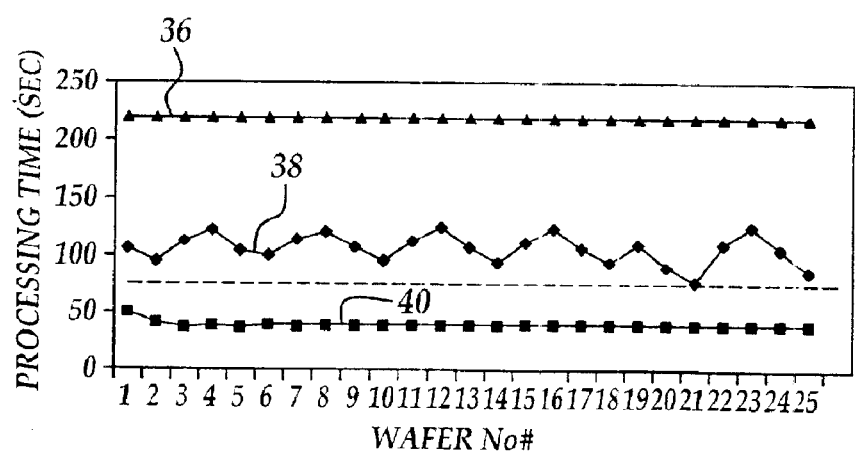
FIG. 2 is a chart showing the wafer processing times for each segment of the scanner based on a continuous run.
Figure 3:
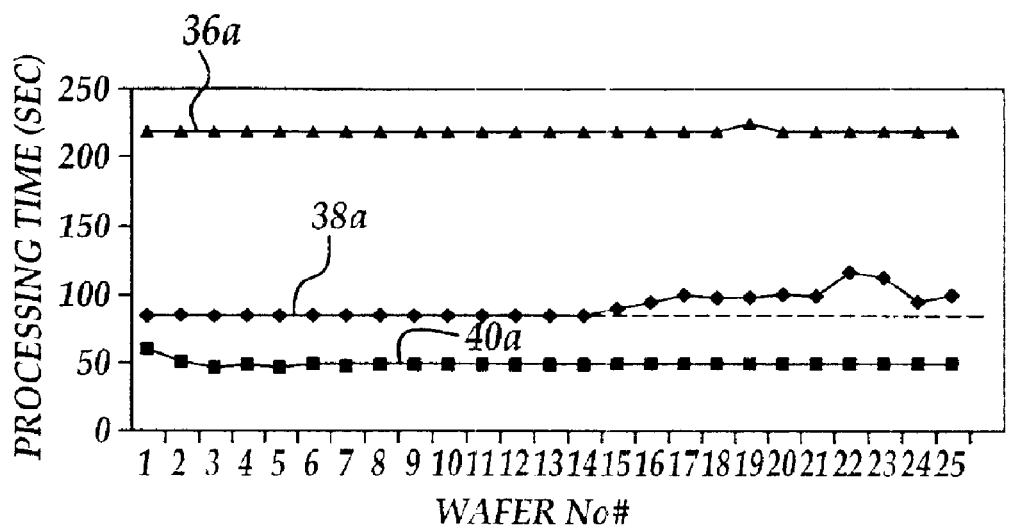
FIG. 3 is a view similar to FIG. 2, but depicting processing times for a discontinuous run.

The ideal processing times (i.e. the fastest segment) are given by:

$TCOT = Min\,(TCm)$  $m = 1,2,3, \ldots n$
$TSCN = Min\,(TSm)$  $m = 1,2,3, \ldots n$
$TDEV = Min\,(TDm)$  $m = 1,2,3, \ldots n$ In order to confirm that the ideal processing times are the minimum processing times, Applicants the following experiment was conducted and in this connection reference is made now to FIGS. 2 and 3. In this experiment, 25, wafers were selected as the lot sample used to determine the ideal (minimum) processing time. It is important to observe that the pull type effect created by wafers ahead in the processing sequence may block the wafers behind, although in an ideal situation the time wafers stay in a tool unit should be regular. The "block effect" may force a wafer to remain in a tool unit for a prolonged period. Thus, in order to determine bottlenecks for purposes of the present method, it is necessary to consider situations that exclude the block effect. The bottleneck is obviously the slowest segment by contrast.

The experiment consisted of running two batches of wafers in continuous and discontinuous operations, respectively. These two batches are referred to as lot A (continuous run) and Lot B (discontinuous run). Wafer lots A and B ran the same recipe on the same tool. Lot A was processed closely following a previous lot, and therefore is referred to as a "continuous run". Lot B, however, was run after a previous lot had been completed and left the cluster tool, and therefore is referred to as a "discontinuous run". FIG. 2 is a graph showing the processing times for each of the 25 wafers in Lot A, and depicts the times required to pass through each of the segments. Specifically, plot 36 shows the processing time in segment DEV 26, plot 38 shows the processing time in segment COT 10 and plot 40 shows the processing time in segment SCM 20. In the present example, segment COT 10 comprised two tool units. Segment SCM 20 comprised a single tool unit and segment DEV 26 comprised four tool units. Similar plots 36a, 38a, 48a are shown in FIG. 3.

From FIG. 2 it is apparent that there is a variation of the segment COT processing time due to the block effect. In contrast, as shown in FIG. 3, the segment COT processing time of the first fourteen wafers is nearly constant with no block effect. In the case of the discontinuous run of lot B shown in FIG. 3 the ideal processing time may be directly inferred to be the minimum time. For the continuous run of lot A shown in FIG. 2 the minimum processing time is equal to or close to the ideal processing time. Based on this information, it was concluded that choosing the minimum processing time as the ideal time is appropriate regardless of whether the lot is run in a continuous or discontinuous manner. Based on the empirical data shown in FIGS. 2 and 3, it was concluded that the ideal processing times of segments COT, SCM and DEV are 76, 38 and 218 respectively, regardless of whether the data of lot A or lot B runs is used.

The next step in the present invention is to determine the location of the bottleneck and the process flow through the scanner 15 and track 17 shown in FIG. 1. Specifically the objective is to determine which of the segments 12, 20, 26 has the longest processing time and is thus a bottleneck in the process flow. The bottleneck is given by the formula:

---

Max {TCOT/i, TSCN/j, TDEV/k} = Max {Min(TCm)/i, Min(TSm)/j, Min (TDm) /k}
  If Max {TCOT/i, TSCN/j, TDEV/k} = TCOT/i, then the bottleneck is segment COT.
  Similarly, if Max {TCOT/i, TSCN/j, TDEV/k} = TSCN/j, then the bottleneck is segment SCN, and
    if Max {TCOT/i, TSCN/j, TDEV/k} = TDEV/k, then the bottleneck is segment DEV

---

Figure 4:
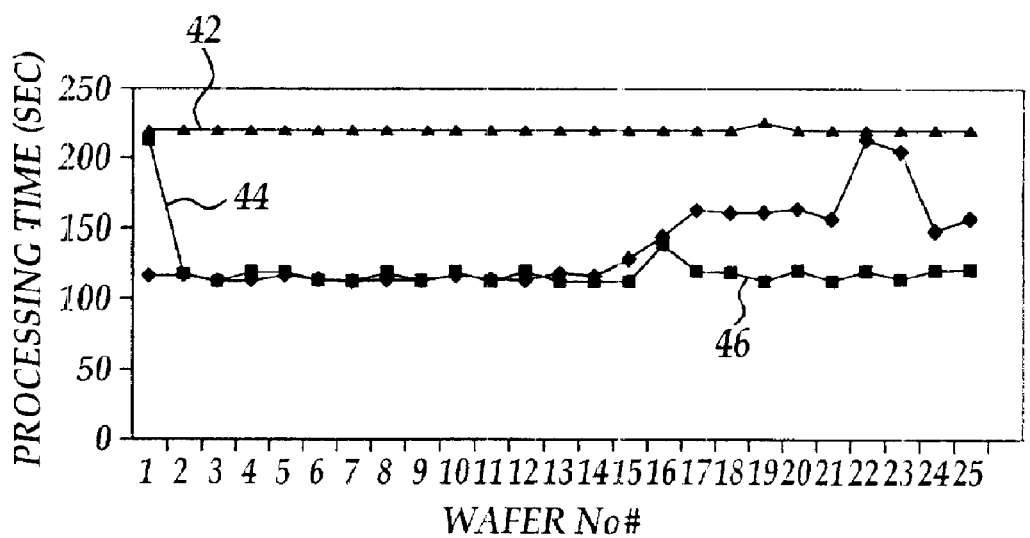
FIG. 4 is a chart showing wafer processing times for each of the segments and depicting a bottleneck.
Figures 5, 6:
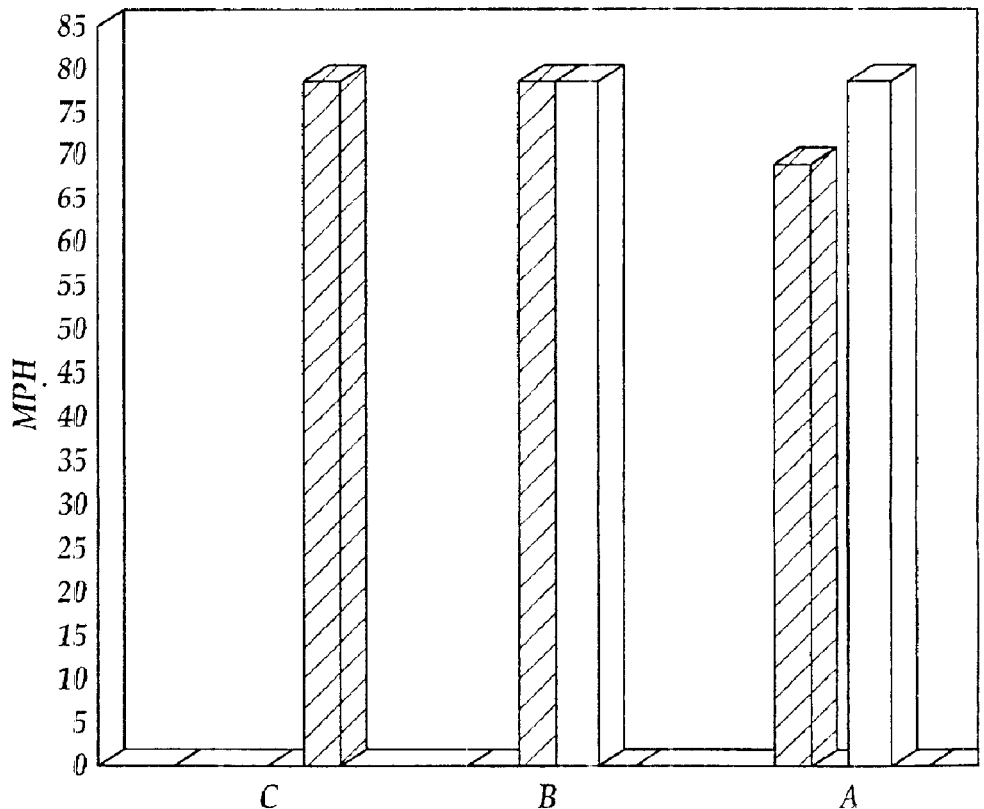
FIG. 5 is a table showing the minimum processing times for units among a lot of wafers for each of the segments; and, FIG. 6 is an improvement trend chart for multiple cluster tools.

Reference is also now made to FIGS. 4 and 5 which provide the basis for determining the bottleneck. FIG. 4 is a plot of the individual segmental processing times, which is essentially the reciprocal of the throughput. FIG. 5 depicts statistical information showing the processing time through each of the segments for a number of machines. In order to determine the actual processing times for each of the segments, the times shown in FIG. 5 must be divided by the number of machines in the corresponding segment. Thus, for example the processing times "TC" must be divided by 2 since in the present example, segment COT 12 includes two coater tool units. Similarly, the processing times, "PD" for segment 26 must be divided by 4 since there are four developing tool units in that segment. In effect, this procedure provides the average processing time for the tool units in the segment, thus enabling the processing times of the three segments to be compared for the purpose of identifying the bottleneck. It should also be noted here that in determining the bottleneck in accordance with the method of the present invention, it is important to employ a sufficiently large lot of wafers, and in this connection it has been found that the lot should comprise no less than 10 wafers, although 25 wafers has been found to provide the most satisfactory results.

The bottleneck can be determined by dividing the processing times by the number of tool units in the corresponding segment and determining which segmental processing time is largest. The results showing which segment is the bottleneck is designated in the last column as "B/N". The lot sizes used to generate the information for the table shown on FIG. 5 were all 25 wafers. FIG. 4 shows the processing times for each of the segments COT, SCN and DEV, wherein plots 42, 44 and 46 respectively designate segments DEV, SCN and COT. From the plot shown in FIG. 4, it may be seen that the segment DEV is the bottleneck at 55 seconds, compared to segment COT and SCN which are both 38 seconds.

Consistent with the theory of constraints, the actual bottleneck is determined for each historical lot of wafers processed. With this information in hand, it is then possible to determine how the processes or tool units may be adjusted to improve the processing times. In the illustrated example, the data shown in the table of FIG. 5 indicates that tool A consistently was the slowest in the segment SCN compared with tool B and C. Based on this information, steps were taken to improve the tool units in segment SCN of tool A so that the performance of tool A and segment SCN was equal to or better than that for tool B or C.

FIG. 6 is a plot of the throughput in terms of wafers per hour for tool A, B, and C shown in FIG. 5. FIG. 6 shows four plots for each of the tools A, B, C respectively representing throughput performance for each of four consecutive weeks. In the case of tool A, it may be observed that notable improvement was achieved during the third week as a result of having identified the bottleneck of segment SCN in tool A and making appropriate corrections to reduce the processing times through segment SCN.

From the foregoing, it is apparent that the method described above not only provides for the reliable accomplishment of the objects of the invention, but does so in a particularly simple and economical manner. It is recognized, of course, that those skilled in the art may make various modifications or additions chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method for improving the throughput performance of a photolithography cluster tool having a plurality of process segments each associated with a different processing operation within said cluster tool for processing semiconductor wafers within the cluster tool, comprising the steps of:

(A) determining the segmental process time for each of said segments based on a wafer lot of predetermined size, wherein each of the plurality of process segments has associated plurality of tool units that carry out identical process functions within the plurality of process segments;

(B) identifying a segment causing a bottleneck in the flow of wafers through said segments based on the times determined in step (A); and, (C) making process changes in the segment identified in step (B).

2. The method of claim 1, wherein step (A) includes recording the times required by each of said plurality of tool units in at least certain of said segments to process each of the wafers in said lot.

3. The method of claim 2, wherein step (A) includes determining the average time required by each of said tool units in said certain segments to process said wafers.

4. The method of claim 2, wherein step (A) includes summing the time required by each of said tool units in each of said certain segments, and dividing said sum by the number of tool units in the corresponding segment to produce an average process time for the segment.

5. The method of claim 4, wherein step (B) is performed by identifying the segment having largest average process time.

6. The method of claim 1, wherein step (B) is performed by identifying the segment having the largest segmental process time.

7. The method of claim 2, wherein step (A) includes determining the number of said tool units in each of said segments, and determining the average tool unit process time using the determined number of tool units.

8. The method of claim 1, wherein step (A) includes recording the times required by one or more tool units in each of said segments to process each wafer passing through the segment.

9. The method of claim 8, wherein step (A) further includes determining the average time of all of said tool units in each of said segments to process all of the wafers in said lot.

10. The method of claim 9, wherein step (B) is performed by determining the segment having the greatest average determined processing time of said tool units.

11. The method of claim 1, wherein step (A) is performed by improving the performance of at least certain of tool units in the segment identified in step (B).

12. The method of claim 11, wherein the improvement is made in the tool unit having the slowest time for processing wafers therethrough.

13. A method for determining a bottleneck in the flow of product through a cluster tool having a plurality of differing process segments, and multiple tool units in each of said segments, comprising the steps of:

(A) determining the number of said tool units in each of said segments, wherein each of multiple tool units in each of said segments carry out identical process functions within the plurality of differing process segments;

(B) determining the segmental process time for each of said segments based on a product lot sample of preselected size;

(C) calculating the throughput of said product through each of said segments; and, (D) identifying the bottleneck based on the process segment having the longest segmental process time.

14. The method of claim 13, wherein step (C) is performed by the dividing segmental process time determined in step (B) by the number of tool units in the corresponding segment.

15. The method of claim 13, wherein step (B) includes recording the times required by each of said tool units in each of said segments to process each of said wafers.

16. The method of claim 14, wherein step (B) includes recording the times required by each of said tool units in each of said segments to process each of said wafers.

17. The method of claim 1, wherein step (C) includes adjusting a performance of each tool unit within each segment to be as good as a tool unit having a best performance, wherein the tool unit having the best performance is a tool unit having a minimum process time.

* * * * *